United States Patent
Venugopal et al.

(10) Patent No.: US 11,581,932 B2
(45) Date of Patent: Feb. 14, 2023

(54) TECHNIQUES FOR CHANNEL STATE INFORMATION PROCESSING UNIT OCCUPANCY DETERMINATION FOR LAYER 1 SIGNAL TO INTERFERENCE PLUS NOISE RATIO REPORTING

(71) Applicant: QUALCOMM Incorporated, San Diego, CA (US)

(72) Inventors: Kiran Venugopal, Raritan, NJ (US); Yan Zhou, San Diego, CA (US); Jung Ho Ryu, Fort Lee, NJ (US); Tianyang Bai, Somerville, NJ (US); Tao Luo, San Diego, CA (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/074,853

(22) Filed: Oct. 20, 2020

(65) Prior Publication Data

US 2021/0126687 A1 Apr. 29, 2021

Related U.S. Application Data

(60) Provisional application No. 62/925,178, filed on Oct. 23, 2019.

(51) Int. Cl.
*H04W 24/10* (2009.01)
*H04B 7/06* (2006.01)
(Continued)

(52) U.S. Cl.
CPC ......... *H04B 7/0626* (2013.01); *H04B 17/336* (2015.01); *H04L 5/0051* (2013.01); *H04W 24/10* (2013.01)

(58) Field of Classification Search
CPC .. H04B 7/0626; H04B 17/336; H04B 7/0632; H04L 5/0051
(Continued)

(56) References Cited

U.S. PATENT DOCUMENTS

| | | | |
|---|---|---|---|
| 2020/0084006 A1* | 3/2020 | Rahman | H04L 5/0057 |
| 2020/0112869 A1* | 4/2020 | Kim | H04B 7/0632 |

(Continued)

FOREIGN PATENT DOCUMENTS

WO WO-2020142951 A1 7/2020

OTHER PUBLICATIONS

3GPP TS 38.214: "3rd Generation Partnership Project; Technical Specification Group Radio Access Network; NR; Physical Layer Procedures for Data (Release 15)", 3GPP Standard Technical Specification, 3rd Generation Partnership Project (3GPP), Mobile Competence Centre, 650, Route Des Lucioles, F-06921 Sophia-Antipolis Cedex, France, vol. RAN WG1, No. V15.7.0, Sep. 28, 2019 (Sep. 28, 2019), pp. 1-106, XP051785090, Retrieved from the Internet: URL: http://ftp.3gpp.org/Specs/archive/38_series/38.214/38214-f70.zip 38214-f70.docx [retrieved on Sep. 28, 2019] section 5.1.2.1; p. 11, Section 5.1.5; p. 28-p. 29 section 5.2.1.5.1; p. 42-p. 44, section 5.2.1.5.2, tables 5.2.1.5.2-2, section 5.1.5.

(Continued)

*Primary Examiner* — German Viana Di Prisco
(74) *Attorney, Agent, or Firm* — Harrity & Harrity LLP

(57) ABSTRACT

Various aspects of the present disclosure generally relate to wireless communication. In some aspects, a user equipment (UE) may receive a channel state information (CSI) reporting configuration for a CSI report, wherein the CSI reporting configuration indicates that the CSI report is to include a layer 1 signal to interference plus noise ratio (L1-SINR). The UE may determine a number of CSI processing units (Continued)

(CPUs) occupied for processing of the CSI report that is to include the L1-SINR. Numerous other aspects are provided.

30 Claims, 5 Drawing Sheets

(51) Int. Cl.
*H04L 5/00* (2006.01)
*H04B 17/336* (2015.01)

(58) Field of Classification Search
USPC ................ 370/329, 310.2; 455/450, 418
See application file for complete search history.

(56) References Cited

U.S. PATENT DOCUMENTS

| | | | | |
|---|---|---|---|---|
| 2020/0145164 | A1* | 5/2020 | Cheng | H04W 52/265 |
| 2021/0153059 | A1* | 5/2021 | Shi | H04W 24/10 |
| 2021/0153085 | A1* | 5/2021 | Rahman | H04W 36/00835 |
| 2021/0160716 | A1* | 5/2021 | Shi | H04L 1/0028 |
| 2021/0218453 | A1 | 7/2021 | Song et al. | |
| 2021/0298038 | A1* | 9/2021 | Kang | H04B 7/06 |
| 2021/0306060 | A1* | 9/2021 | Matsumura | H04W 24/10 |
| 2021/0314801 | A1* | 10/2021 | Zhang | H04W 24/10 |
| 2021/0337415 | A1* | 10/2021 | Chen | H04W 24/08 |
| 2021/0337549 | A1* | 10/2021 | Zhang | H04W 24/10 |
| 2021/0345141 | A1* | 11/2021 | Cao | H04L 5/0023 |

OTHER PUBLICATIONS

Apple Inc: "Feature Lead Summary 3 on SCell BFR and L1-SINR", 3GPP Draft, 3GPP TSG-RAN WG1 Meeting #98bis, R1-1911610, Feature Lead Summary 3 on SCell BFR and L1-SINR_R5, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019 Oct. 22, 2019 (Oct. 22, 2019), XP051790065, 24 pages, Retrieved from the Internet: URL: https://ftp.3gpp.org/tsg_ran/WG1_RL1/TSGR1_98b/Docs/R1-1911610.zip. R1-1911610 Feature Lead Summary on SCell BFR andL1SINR r5.docx [retrieved on Oct. 22, 2019] p. 20, paragraph 3.5.

Intel Corporation: "Discussion on Multi-Beam Enhancements", 3GPP Draft, 3GPP TSG RAN WG1 #98bis, R1-1910669, Discussion on Multi-Beam Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 5, 2019 (Oct. 5, 2019), XP051808634, 10 Pages, Retrieved from the Internet: URL: https://ftp.3gpp.org/tsg_ran/WG1_RL1/TSGR1_98b/Docs/R1-1910669.zip. R1-1910669 Discussion on multi-beam enhancements .docx [retrieved on Oct. 5, 2019] p. 6-p. 7.

International Search Report and Written Opinion—PCT/US2020/056620—ISA/EPO—dated Feb. 3, 2021.

* cited by examiner

TECHNIQUES FOR CHANNEL STATE INFORMATION PROCESSING UNIT OCCUPANCY DETERMINATION FOR LAYER 1 SIGNAL TO INTERFERENCE PLUS NOISE RATIO REPORTING

CROSS-REFERENCE TO RELATED APPLICATION

This patent application claims priority to U.S. Patent Application No. 62/925,178, filed on Oct. 23, 2019, entitled "TECHNIQUES FOR CHANNEL STATE INFORMATION PROCESSING UNIT OCCUPANCY DETERMINATION FOR LAYER 1 SIGNAL TO INTERFERENCE PLUS NOISE RATIO REPORTING," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for channel state information processing unit occupancy for layer 1 signal to interference plus noise ratio reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving a channel state information (CSI) reporting configuration for a CSI report, wherein the CSI reporting configuration indicates that the CSI report is to include a layer 1 signal to interference plus noise ratio (L1-SINR); and determining a number of CSI processing units (CPUs) occupied for processing of the CSI report that is to include the L1-SINR.

In some aspects, the number of CPUs occupied for processing of the CSI report that is to include the L1-SINR is one.

In some aspects, the CSI reporting configuration indicates that the CSI report is to include the L1-SINR by including a report quantity parameter that is set to 'cri-SINR.'

In some aspects, the CSI reporting configuration indicates that the CSI report is to include the L1-SINR by including a report quantity parameter that is set to 'ssb-Index-SINR.'

In some aspects, the CSI reporting configuration indicates that the CSI report is to include the L1-SINR using a report quantity parameter in the CSI report.

In some aspects, the number of CPUs occupied for processing of the CSI report that is to include the L1-SINR is equal to a number of CPUs occupied for processing a reference signal received power parameter.

In some aspects, the method includes selectively updating the CSI report based at least in part on the number of CPUs occupied for processing of the CSI report that is to include the L1-SINR.

In some aspects, the number of CPUs occupied for processing of the CSI report that is to include the L1-SINR is determined based at least in part on receiving a request for the CSI report.

In some aspects, a UE for wireless communication includes a memory and one or more processors operatively coupled to the memory. The memory and the one or more processors may be configured to receive a CSI reporting configuration for a CSI report, wherein the CSI reporting configuration indicates that the CSI report is to include an L1-SINR; and determine a number of CPUs occupied for processing of the CSI report that is to include the L1-SINR.

In some aspects, the number of CPUs occupied for processing of the CSI report that is to include the L1-SINR is one.

In some aspects, the CSI reporting configuration indicates that the CSI report is to include the L1-SINR by including a report quantity parameter that is set to 'cri-SINR.'

In some aspects, the CSI reporting configuration indicates that the CSI report is to include the L1-SINR by including a report quantity parameter that is set to 'ssb-Index-SINR.'

In some aspects, the CSI reporting configuration indicates that the CSI report is to include the L1-SINR using a report quantity parameter in the CSI report.

In some aspects, the number of CPUs occupied for processing of the CSI report that is to include the L1-SINR is equal to a number of CPUs occupied for processing a reference signal received power parameter.

In some aspects, the one or more processors are further configured to selectively update the CSI report based at least in part on the number of CPUs occupied for processing of the CSI report that is to include the L1-SINR.

In some aspects, the number of CPUs occupied for processing of the CSI report that is to include the L1-SINR is determined based at least in part on receiving a request for the CSI report.

In some aspects, a non-transitory computer-readable medium storing a set of instructions for wireless communication includes one or more instructions that, when executed by one or more processors of a UE, cause the UE to receive a CSI reporting configuration for a CSI report, wherein the CSI reporting configuration indicates that the CSI report is to include an L1-SINR; and determine a number of CPUs occupied for processing of the CSI report that is to include the L1-SINR.

In some aspects, the number of CPUs occupied for processing of the CSI report that is to include the L1-SINR is one.

In some aspects, the CSI reporting configuration indicates that the CSI report is to include the L1-SINR by including a report quantity parameter that is set to 'cri-SINR.'

In some aspects, the CSI reporting configuration indicates that the CSI report is to include the L1-SINR by including a report quantity parameter that is set to 'ssb-Index-SINR.'

In some aspects, the CSI reporting configuration indicates that the CSI report is to include the L1-SINR using a report quantity parameter in the CSI report.

In some aspects, the number of CPUs occupied for processing of the CSI report that is to include the L1-SINR is equal to a number of CPUs occupied for processing a reference signal received power parameter.

In some aspects, the one or more instructions further cause the UE to selectively update the CSI report based at least in part on the number of CPUs occupied for processing of the CSI report that is to include the L1-SINR.

In some aspects, an apparatus for wireless communication includes means for receiving a CSI reporting configuration for a CSI report, wherein the CSI reporting configuration indicates that the CSI report is to include an L1-SINR; and means for determining a number of CPUs occupied for processing of the CSI report that is to include the L1-SINR.

In some aspects, the number of CPUs occupied for processing of the CSI report that is to include the L1-SINR is one.

In some aspects, the CSI reporting configuration indicates that the CSI report is to include the L1-SINR by including a report quantity parameter that is set to 'cri-SINR.'

In some aspects, the CSI reporting configuration indicates that the CSI report is to include the L1-SINR by including a report quantity parameter that is set to 'ssb-Index-SINR.'

In some aspects, the CSI reporting configuration indicates that the CSI report is to include the L1-SINR using a report quantity parameter in the CSI report.

In some aspects, the number of CPUs occupied for processing of the CSI report that is to include the L1-SINR is equal to a number of CPUs occupied for processing a reference signal received power parameter.

In some aspects, the apparatus includes means for selectively updating the CSI report based at least in part on the number of CPUs occupied for processing of the CSI report that is to include the L1-SINR.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
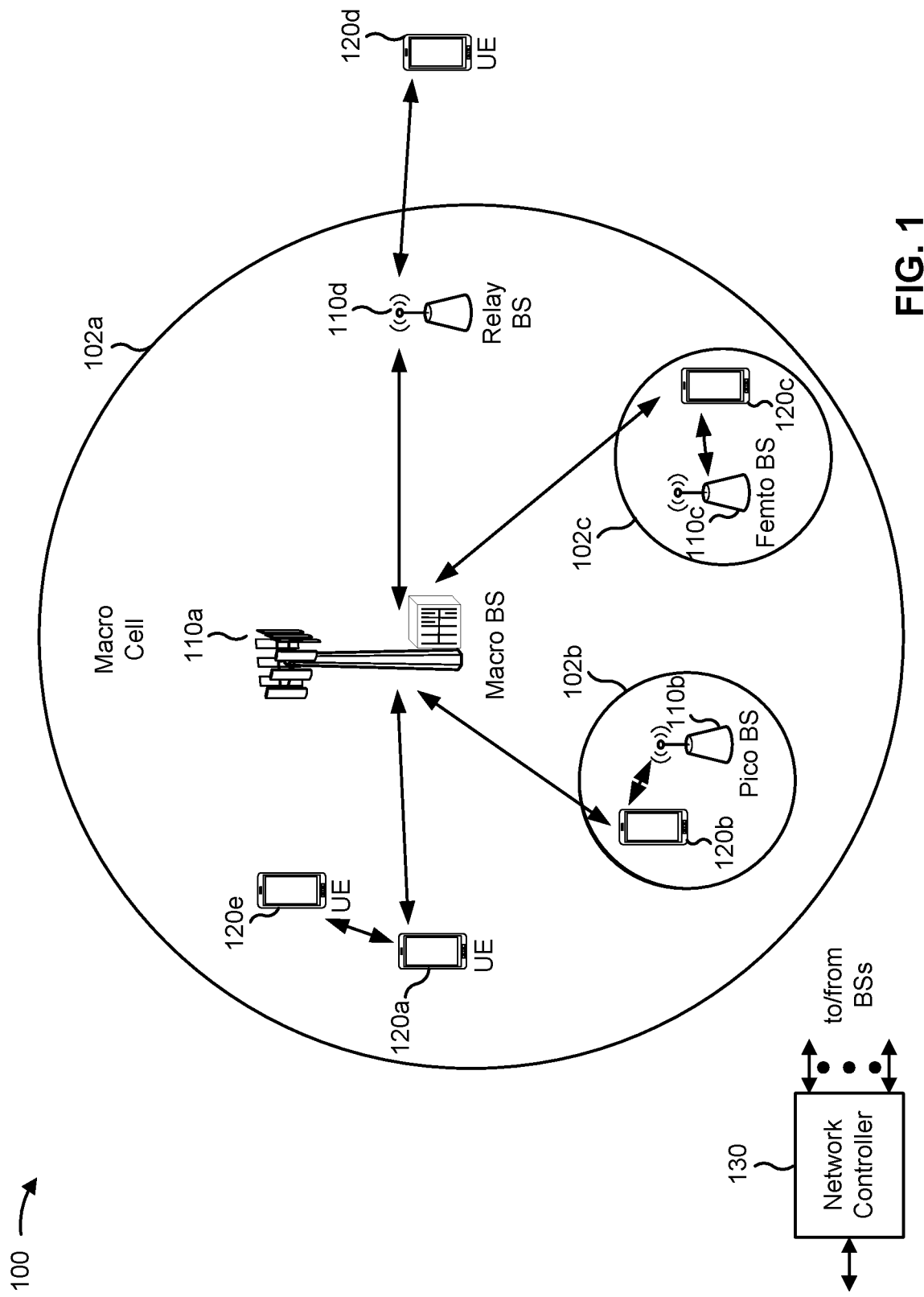
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
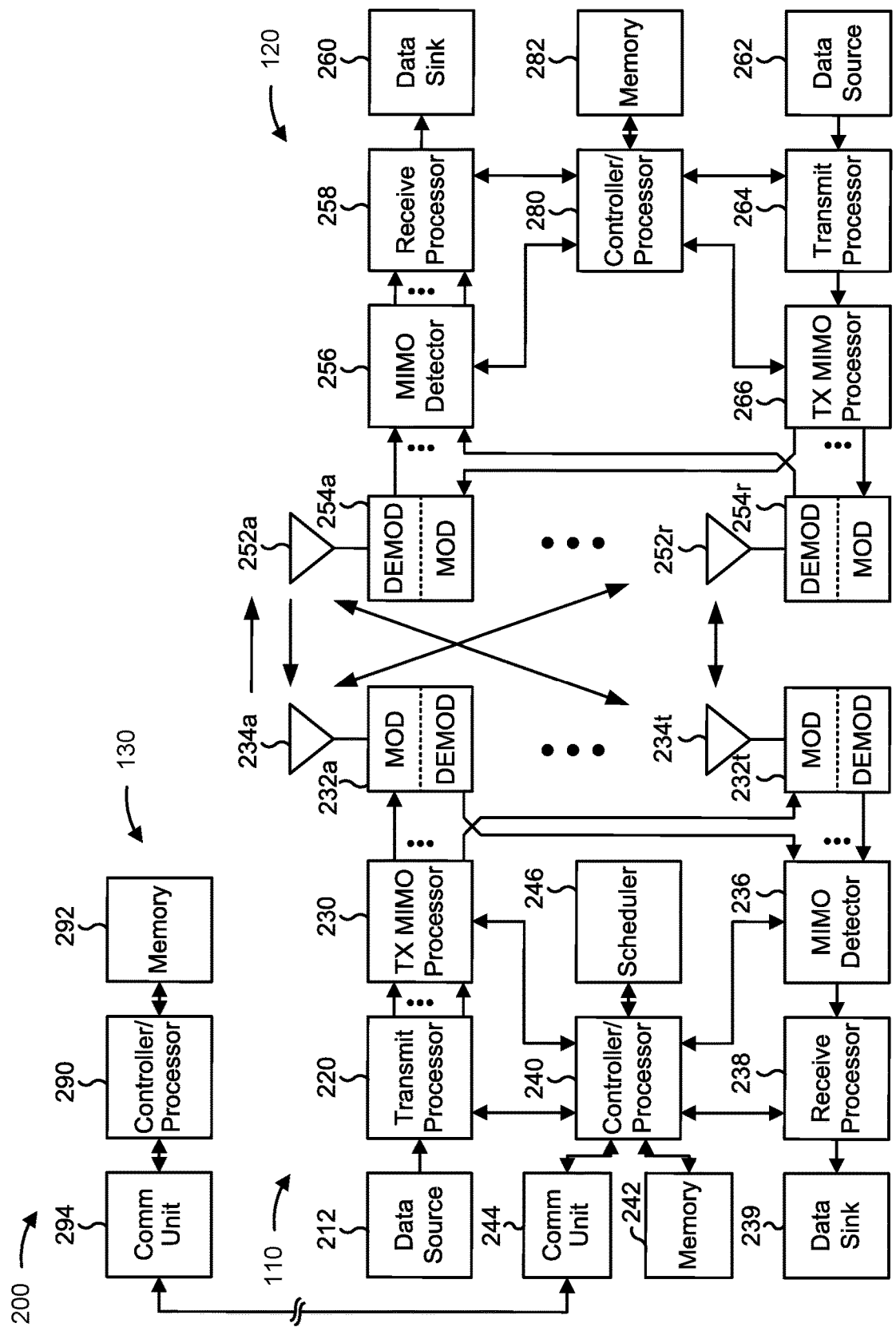
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information processing unit occupancy for layer 1 signal to interference plus noise ratio reporting, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 includes means for receiving a CSI reporting configuration for a CSI report, wherein the CSI reporting configuration indicates that the CSI report is to include L1-SINR; means for determining a number of CPUs occupied for processing of the CSI report that is to include the L1-SINR; and/or the like. In some aspects, the UE 120 includes means for selectively updating the CSI report based at least in part on the number of CPUs occupied for processing of the CSI report that is to include the L1-SINR. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

When determining whether to update channel state information (CSI), a UE may determine a CSI processing unit (CPU) occupancy for a CSI report, denoted as $O_{CPU}^{(n)}$ for a CSI report n. The UE may be capable of a number (e.g., a maximum number) of simultaneous CSI calculations, denoted as $N_{CPU}$. Additionally, or alternatively, the value of $N_{CPU}$ may indicate a number (e.g., a maximum number) of CPUs that the UE is capable of using to process CSI report across all configured cells. In some aspects, the UE may report the value of $N_{CPU}$ to a base station, such as in a UE capability report. If L CPUs of the UE are occupied in a given OFDM symbol, then the UE 120 may have $N_{CPU}$ minus L ($N_{CPU}-L$) unoccupied CPUs (e.g., CPUs available for performing a CSI calculation and/or processing a CSI report) in the OFDM symbol.

When performing CSI processing, the UE may drop one or more low priority CSI reports if the UE does not have enough available CPUs to process all CSI reports in a given OFDM symbol. Each CSI report n configured for the UE may be associated with a CPU occupancy $O_{CPU}^{(n)}$. Furthermore, each CSI report may be associated with a priority. In some cases, different CSI reports may be associated with different CPU occupancies and/or different priorities. Depending on the CPU occupancy of the CSI reports configured for the UE and/or requested by the base station, the UE is not required to update N minus M (N–M) requested CSI reports with the lowest priority (as compared to the other requested CSI reports, where:

$$\Sigma_{n=0}^{M} O_{CPU}^{(n)} \leq N_{CPU} - L$$

In other words, the UE may determine whether the UE has sufficient CPUs available (e.g., unoccupied) in an OFDM symbol to process a highest priority CSI report based at least in part on a CPU occupancy of the highest priority CSI report. If the UE has sufficient CPUs available in the OFDM symbol to process the highest priority CSI report, then the UE may determine whether the UE has sufficient CPUs available in the OFDM symbol (after considering the CPUs needed to process the highest priority CSI report) to process a second-highest priority CSI report based at least in part on a CPU occupancy of the second-highest priority CSI report. If the UE has sufficient CPUs available in the OFDM symbol to process the highest priority CSI report and the second-highest priority CSI report, then the UE may determine whether the UE has sufficient CPUs available in the OFDM symbol (after considering the CPUs needed to process the highest priority CSI report and the second-highest priority CSI report) to process a third-highest priority CSI report based at least in part on a CPU occupancy of the third-highest priority CSI report, and so on. When the UE determines that the UE does not have sufficient CPUs available in the OFDM symbol for a given CSI report, then the UE may refrain from performing CSI processing for the CSI report (e.g., may refrain from updating CSI for the given CSI report) and for any other CSI reports having a lower priority than the given CSI report. In this case, the UE may transmit previously-determined CSI in the CSI report (e.g., without updating the CSI).

In NR, layer 1 signal to interference plus noise ratio (L1-SINR) has been added as a value that can be reported in a CSI report. Due to the nature of L1-SINR derivation and processing, several different CPU occupancy values could be used for CSI reports that include L1-SINR. Some techniques and apparatuses described herein enable a UE to determine a CPU occupancy to be used for CSI reports that include L1-SINR.

Figure 3:
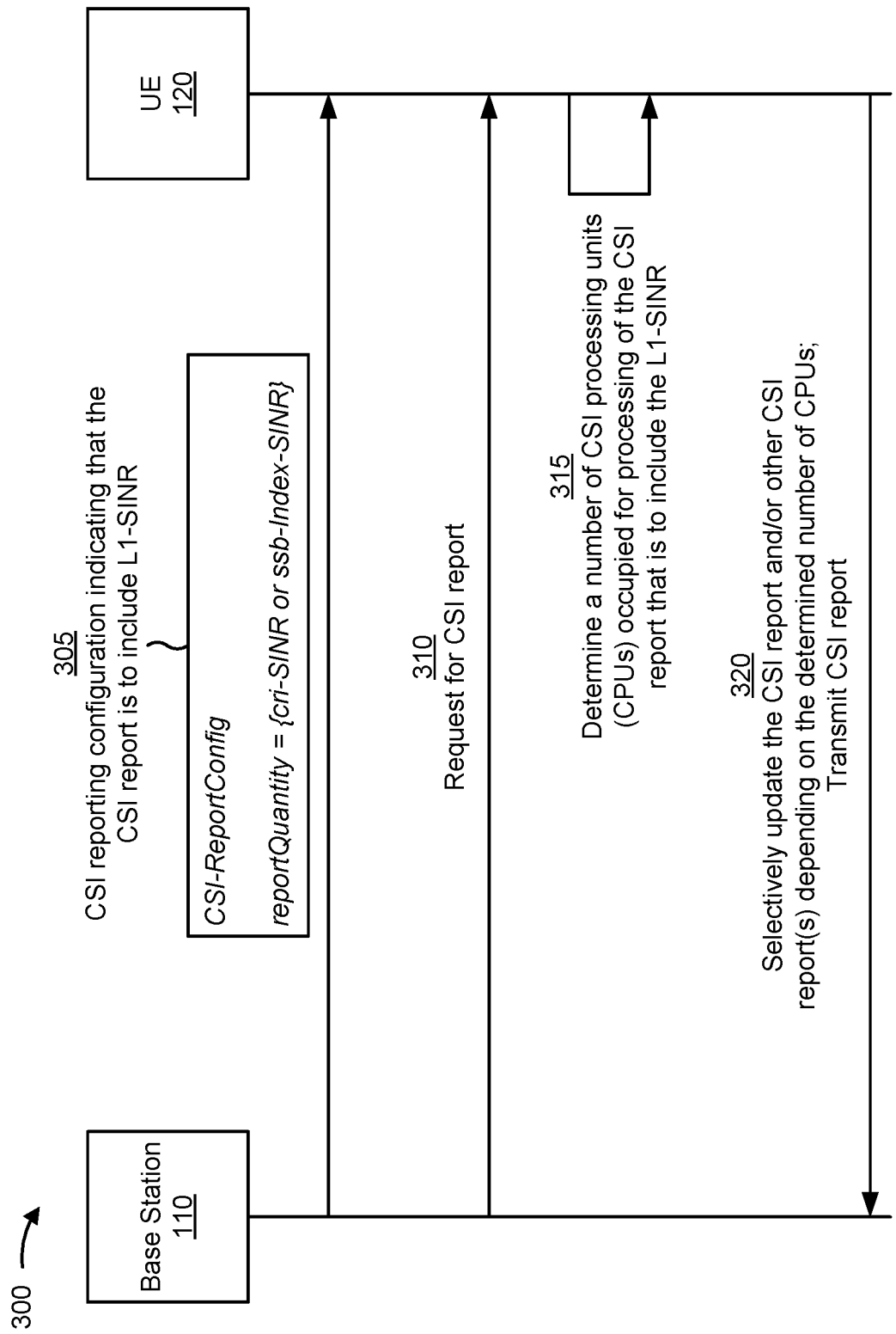
FIG. 3 is a diagram illustrating an example of channel state information processing unit occupancy for layer 1 signal to interference plus noise ratio reporting, in accordance with various aspects of the present disclosure.

FIG. 3 is a diagram illustrating an example of channel state information processing unit occupancy for layer 1 signal to interference plus noise ratio reporting, in accordance with various aspects of the present disclosure. As shown in FIG. 3, a base station 110 and a UE 120 may communicate with one another.

As shown by reference number 305, the base station 110 may transmit, to the UE 120, a CSI reporting configuration for a CSI report. The CSI reporting configuration may indicate that the CSI report is to include L1-SINR. In some aspects, the CSI reporting configuration may be included in a radio resource control (RRC) message, such as an RRC configuration message, an RRC reconfiguration message, and/or the like. In some aspects, a CSI reporting configuration (CSI-ReportConfig) for a CSI report may include a report quantity (report Quantity) information element or parameter that indicates the quantities or parameters that are to be reported in the CSI report. In some aspects, the report quantity IE may indicate that an L1-SINR parameter is to be included in the CSI report, such as by including a value of 'cri-SINR', 'ssb-Index-SINR', and/or the like. Additionally, or alternatively, the report quantity IE may indicate one or more other parameters that are to be reported in the CSI report (e.g., the same CSI report as the L1-SINR), such as a rank indication (RI) parameter, a channel quality indication (CQI) parameter, a precoding matrix indication (PMI) parameter, a reference signal received power (RSRP) parameter, a layer indication (LI) parameter, and/or the like. For example, the report quantity IE may include a value of 'cri-RI-PMI-CQI', 'cri-RI-i1', 'cri-RI-i1-CQI', 'cri-RI-CQI', 'cri-RSRP', 'ssb-Index-RSRP', 'cri-RI-LI-PMI-CQI', and/or the like.

In some aspects, the UE 120 may indicate a UE capability for a number (e.g., a maximum number) of CPUs for processing CSI reports across all configured cells, sometimes referred to as a UE capability for a number (e.g., a maximum number) of simultaneous CSI calculations, either or both of which may be denoted as $N_{CPU}$. In some aspects, the UE 120 may transmit the UE capability in a UE capability report (e.g., prior to receiving the CSI reporting configuration, in some aspects).

As shown by reference number 310, the base station 110 may transmit, to the UE 120, a request for a CSI report (e.g., a CSI request). In some aspects, the request is a request for a periodic CSI report. In this case, the base station 110 may indicate a periodicity and/or a set of uplink resources for transmission of the CSI report, a periodicity and/or a set of downlink resources for reference signals (e.g., channel state information reference signals (CSI-RSs), synchronization signal blocks (SSBs), and/or the like) to be measured by the UE 120 for the CSI report, and/or the like. In some aspects, the request is a request for aperiodic CSI. In this case, the base station 110 may indicate a set of uplink resources for transmission of the CSI report, a set of downlink resources for reference signals (e.g., CSI-RSs, SSBs, and/or the like) to be measured by the UE 120 for the CSI report, and/or the like. In some aspects, the request may be included in an RRC message, such as the same RRC message that includes the CSI reporting configuration. Additionally, or alternatively, the request may be included in downlink control information (DCI), a medium access control (MAC) control element (CE), and/or the like.

As shown by reference number 315, the UE 120 may determine a number of CSI processing units (CPUs) occupied for processing of the CSI report that is to include the L1-SINR. In some aspects, the number of CPUs occupied for processing of a CSI report that is to include L1-SINR may be prespecified according to a wireless communication standard. Additionally, or alternatively, the UE 120 may determine the number of CPUs occupied for processing of a CSI report that is to include L1-SINR based at least in part on a rule. The rule may be prespecified according to a wireless communication standard and/or may signaled to the UE 120 in a configuration message. Additionally, or alternatively, the UE 120 may determine the number of CPUs occupied for processing of the CSI report that is to include the L1-SINR based at least in part on receiving the request for the CSI report.

In some aspects, the number of CPUs occupied for processing of the CSI report that is to include the L1-SINR is zero. For example, the UE 120 may derive L1-SINR from one or more reference signals (e.g., an interference signal) and/or one or more parameters (e.g., RSRP). The UE 120 may be capable of receiving such signal(s) and/or determining such parameter(s) prior to the OFDM symbol associated with processing of the CSI report. Additionally, or alternatively, deriving L1-SINR from these signal(s) and/or parameter(s) may not be resource intensive. Thus, the number of CPUs occupied for processing of the CSI report that is to include the L1-SINR may be set equal to zero.

In some aspects, the number of CPUs occupied for processing of the CSI report that is to include the L1-SINR is one. In this case, the number of CPUs occupied for processing (e.g., deriving, calculations, and/or the like) L1-SINR may be equal to the number of CPUs occupied for processing RSRP.

In some aspects, the number of CPUs occupied for processing of the CSI report that is to include the L1-SINR is equal to a UE capability for a number (e.g., a maximum number, a reported number, and/or the like) of CPUs for processing CSI reports across all configured cells and/or a UE capability for a number (e.g., a maximum number, a reported number, and/or the like) of simultaneous CSI calculations. In this case, the number of CPUs occupied for processing (e.g., deriving, calculations, and/or the like) L1-SINR may be equal to the value of $N_{CPU}$ reported by the UE 120 to the base station 110 (e.g., in a UE capability report).

In some aspects, the number of CPUs occupied for processing of the CSI report that is to include the L1-SINR is equal to the UE capability for the number of CPUs for processing CSI reports across all configured cells if (e.g., when) a condition is satisfied. In some aspects, the condition is that the CSI report is aperiodically triggered without transmitting a physical uplink shared channel (PUSCH) that includes at least one of a transport block (TB) or hybrid automatic repeat request acknowledgement (HARQ-ACK) feedback (e.g., that includes a TB, HARQ-ACK feedback, or both) when no CPUs are occupied (e.g., L=0 CPUs are occupied), where the CSI corresponds to a single CSI with wideband frequency granularity and to at most 4 CSI-RS ports in a single resource without a CSI-RS resource indicator (CRI) report and where a codebook type (codebookType) is set to 'type1-SinglePanel'. Additionally, or alternatively, the condition may be that the CSI report is to also include at least one of a CQI parameter or a PMI parameter.

In some aspects, the number of CPUs occupied for processing of the CSI report that is to include the L1-SINR is equal to a number of CSI-RSs in a CSI-RS resource set for channel measurement associated with the CSI report. The number of CSI-RSs in a CSI-RS resource set for channel measurement associated with the CSI report may be denoted as $K_s$. In some aspects, the number of CPUs occupied for processing of the CSI report that is to include the L1-SINR is equal to the number of CSI-RSs in the CSI-RS resource set for channel measurement associated with the CSI report if (e.g., when) one or more of the conditions described in the previous paragraph is not satisfied. For example, in some aspects, the number of CPUs occupied for processing of the CSI report that is to include the L1-SINR is equal to the number of CSI-RSs in the CSI-RS resource set for channel measurement associated with the CSI report if (e.g., when) the CSI report is not aperiodically triggered without transmitting a physical uplink shared channel (PUSCH) that includes at least one of a transport block (TB) or hybrid automatic repeat request acknowledgement (HARQ-ACK) feedback when no CPUs are occupied, where the CSI corresponds to a single CSI with wideband frequency granularity and to at most four channel state information reference signal (CSI-RS) ports in a single resource without a CSI-RS resource indicator (CRI) report, and where a codebook type (codebookType) is set to 'type1-SinglePanel'. Additionally, or alternatively, the number of CPUs occupied for processing of the CSI report that is to include the L1-SINR is equal to the UE capability for the number of CPUs for processing CSI reports across all configured cells if (e.g., when) the CSI report does not include a CQI parameter and does not include a PMI parameter.

In some aspects, the UE 120 may determine the number of CPUs occupied for processing of the CSI report that is to include the L1-SINR based at least in part on an L1-SINR measurement resource configuration. In some aspects, the L1-SINR measurement resource configuration may be indicated in a configuration message, such as an RRC message. Additionally, or alternatively, the L1-SINR measurement resource configuration may be indicated in a request that schedules the CSI report. The L1-SINR measurement resource configuration may indicate whether L1-SINR is to be measured on channel measurement resources (CMRs), whether L1-SINR is to be measured on interference measurement resources (IMRs) (e.g., whether dedicated IMRs are configured for L1-SINR measurements), whether CSI-RSs are to be used for the CMRs (e.g., whether CSI-RS-based CMR is to be used, such as with a density of 3 resource elements (REs) per resource block (RB)), whether SSBs are to be used for the CMRs (e.g., whether SSB-based CMR is to be used), whether zero power (ZP) IMRs are to be used, whether non-zero power (NZP) IMRs are to be used (e.g., with a density of 3 REs per RB), and/or the like.

In some aspects, the L1-SINR measurement resource configuration indicates that L1-SINR is to be measured on only CMRs and not on IMRs (e.g., that dedicated IMRs are not configured for L1-SINR measurements). In some aspects (e.g., if the L1-SINR measurement resource configuration indicates that L1-SINR is to be measured on only CMRs and not on IMRs), the L1-SINR measurement resource configuration may indicate CSI-RSs for the CMRs (e.g., may indicate CSI-RS-based CMRs). In some aspects, CSI-RS-based CMRs may have a density of 3 REs per RB.

In some aspects, the L1-SINR measurement resource configuration indicates that L1-SINR is to be measured on both CMRs and on IMRs (e.g., that dedicated IMRs are configured for L1-SINR measurements). For example, in some aspects, the L1-SINR measurement resource configuration may indicate SSBs for the CMRs (e.g., SSB-based CMRs) and may indicate ZP IMRs. In some aspects, the L1-SINR measurement resource configuration may indicate CSI-RSs for the CMRs (e.g., CSI-RS-based CMRs) and may indicate ZP IMRs. In some aspects, the L1-SINR measurement resource configuration may indicate SSBs for the CMRs (e.g., SSB-based CMRs) and may indicate NZP IMRs (e.g., with a density of 3 REs per RB). In some aspects, the L1-SINR measurement resource configuration may indicate CSI-RSs for the CMRs (e.g., CSI-RS-based CMRs) and may indicate NZP IMRs (e.g., with a density of 3 REs per RB). In some aspects, the L1-SINR measurement resource configuration may indicate SSBs for the CMRs (e.g., SSB-based CMRs) and may indicate both ZP and NZP IMRs. In some aspects, the L1-SINR measurement resource configuration may indicate CSI-RSs for the CMRs (e.g., CSI-RS-based CMRs) and may indicate both ZP and NZP IMRs.

In some aspects, for a given L1-SINR measurement resource configuration, the UE 120 may determine the number of CPUs occupied for processing of the CSI report that is to include the L1-SINR. For a given L1-SINR measurement resource configuration, the number of CPUs may be equal to zero, one, $N_{CPU}$, or $K_s$, as described elsewhere herein. In some aspects, different L1-SINR measurement resource configurations may be associated with different numbers of CPUs occupied for processing of the CSI report that is to include the L1-SINR. In some aspects, the number of CPUs for an L1-SINR measurement resource configuration may be prespecified according to a wireless communication standard.

As shown by reference number 320, the UE 120 may selectively update the CSI report (and/or one or more other CSI reports) based at least in part on the determined number of CPUs occupied for processing of the CSI report that is to include the L1-SINR. For example, if the UE 120 has sufficient CPUs available in an OFDM symbol to process the CSI report, then the UE 120 may update CSI for the CSI report, such as by performing CSI calculations (e.g., in the OFDM symbol). In this case, the UE 120 may include the updated CSI in the CSI report, and may transmit the CSI report to the base station 110. If the UE 120 does not have sufficient CPUs available in an OFDM symbol to process the CSI report, then the UE 120 may not update CSI for the CSI report, such as by refraining from performing CSI calculations (e.g., in the OFDM symbol). In this case, in some aspects, the UE 120 transmit previously-determined CSI in the CSI report (e.g., previously-determined CSI that was transmitted in a previous CSI report), and may transmit the CSI report to the base station 110. Alternatively, the UE 120 may drop the CSI report. In this way, the UE 120 may appropriately determine a CPU occupancy to be used for CSI reports that include L1-SINR, and may selectively update CSI reports accordingly.

As indicated above, FIG. 3 is provided as an example. Other examples may differ from what is described with regard to FIG. 3.

Figure 4:
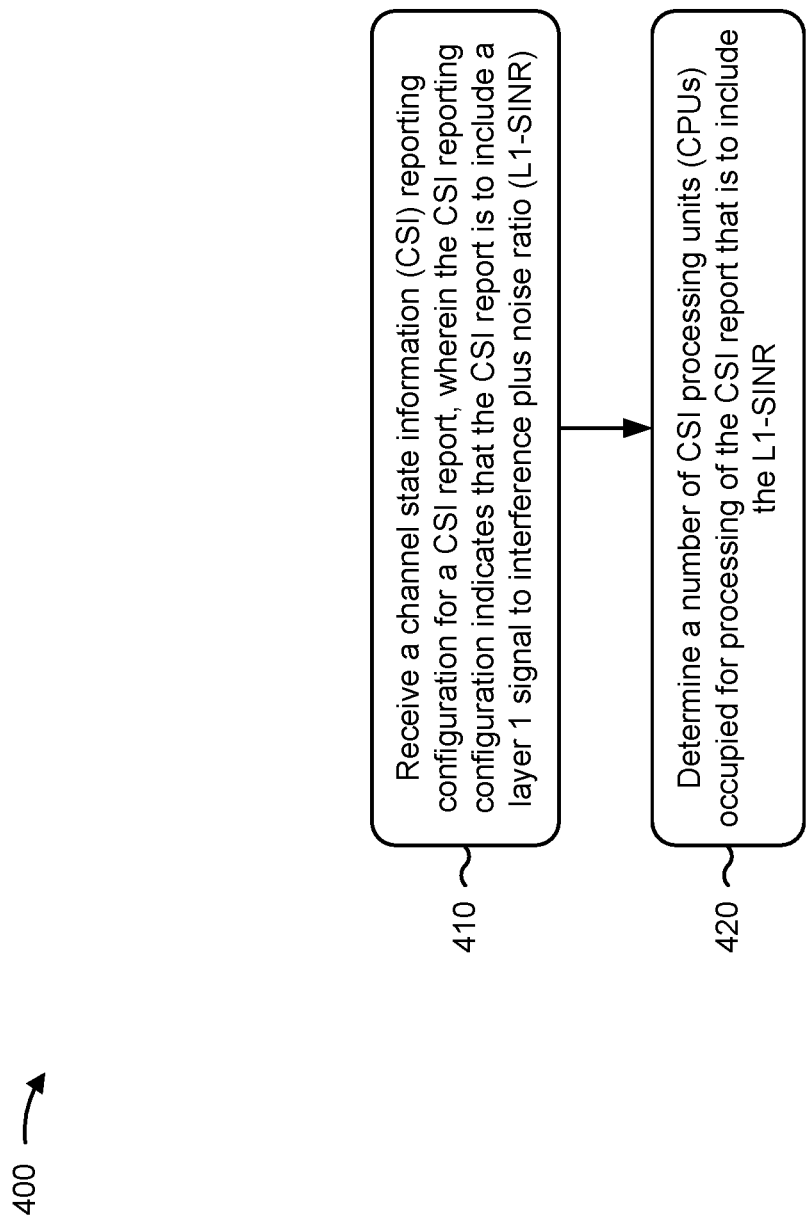
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with techniques for CPU occupancy determination for L1-SINR reporting.

As shown in FIG. 4, in some aspects, process 400 may include receiving a CSI reporting configuration for a CSI report, wherein the CSI reporting configuration indicates that the CSI report is to include L1-SINR (block 410). For example, the UE (e.g., using receive processor 258, controller/processor 280, memory 282, reception component 504 of FIG. 5, and/or the like) may receive a CSI reporting configuration for a CSI report, as described above. In some aspects, the CSI reporting configuration indicates that the CSI report is to include L1-SINR.

As further shown in FIG. 4, in some aspects, process 400 may include determining a number of CPUs occupied for processing of the CSI report that is to include the L1-SINR (block 420). For example, the UE (e.g., using receive processor 258, transmit processor 264, controller/processor 280, memory 282, determination component 506 of FIG. 5, and/or the like) may determine a number of CPUs occupied for processing of the CSI report that is to include the L1-SINR, as described above.

Process 400 may include additional aspects, such as any single aspect or any combination of aspects described below and/or in connection with one or more other processes described elsewhere herein.

In a first aspect, the number of CPUs occupied for processing of the CSI report that is to include the L1-SINR is zero.

In a second aspect, alone or in combination with the first aspect, the number of CPUs occupied for processing of the CSI report that is to include the L1-SINR is one.

In a third aspect, alone or in combination with one or more of the first and second aspects, the number of CPUs occupied for processing of the CSI report that is to include the L1-SINR is equal to a UE capability for a number of CPUs for processing CSI reports across all configured cells.

In a fourth aspect, alone or in combination with one or more of the first through third aspects, the number of CPUs occupied for processing of the CSI report that is to include the L1-SINR is equal to the UE capability for the number of CPUs for processing CSI reports across all configured cells if the CSI report is aperiodically triggered without transmitting a PUSCH that includes at least one of a TB or HARQ-ACK feedback when no CPUs are occupied, where the CSI corresponds to a single CSI with wideband frequency granularity and to at most four CSI-RS ports in a single resource without a CRI report, and where a codebook type is set to 'type1-SinglePanel'.

In a fifth aspect, alone or in combination with one or more of the first through fourth aspects, the number of CPUs occupied for processing of the CSI report that is to include the L1-SINR is equal to a number of CSI-RSs in a CSI-RS resource set for channel measurement associated with the CSI report.

In a sixth aspect, alone or in combination with one or more of the first through fifth aspects, the number of CPUs occupied for processing of the CSI report that is to include the L1-SINR is equal to the number of CSI-RSs in the CSI-RS resource set for channel measurement associated with the CSI report if the CSI report is not aperiodically triggered without transmitting a PUSCH that includes at least one of a TB or HARQ-ACK feedback when no CPUs are occupied, where the CSI corresponds to a single CSI with wideband frequency granularity and to at most four CSI-RS ports in a single resource without a CRI report, and where a codebook type is set to 'type1-SinglePanel'.

In a seventh aspect, alone or in combination with one or more of the first through sixth aspects, the number of CPUs occupied for processing of the CSI report that is to include the L1-SINR is based at least in part on an L1-SINR measurement resource configuration.

In an eighth aspect, alone or in combination with one or more of the first through seventh aspects, the L1-SINR measurement resource configuration indicates that L1-SINR is to be measured on only CMRs and not on IMRs.

In a ninth aspect, alone or in combination with one or more of the first through eighth aspects, the L1-SINR measurement resource configuration indicates CSI-RSs for the CMRs.

In a tenth aspect, alone or in combination with one or more of the first through ninth aspects, the L1-SINR measurement resource configuration indicates that L1-SINR is to be measured on both CMRs and on IMRs.

In an eleventh aspect, alone or in combination with one or more of the first through tenth aspects, the L1-SINR measurement resource configuration indicates one of: SSBs for the CMRs, and zero power IMRs; CSI-RSs for the CMRs, and zero power IMRs; SSBs for the CMRs, and non-zero power IMRs; CSI-RSs for the CMRs, and non-zero power IMRs; SSBs for the CMRs, and both zero power and non-zero power IMRs; or CSI-RSs for the CMRs, and both zero power and non-zero power IMRs.

In a twelfth aspect, alone or in combination with one or more of the first through eleventh aspects, the number of CPUs occupied for processing of the CSI report that is to include the L1-SINR is, for the L1-SINR measurement resource configuration, equal to one of zero, one, a UE capability for a number of CPUs for processing CSI reports across all configured cells, or a number of CSI-RSs in a CSI-RS resource set for channel measurement associated with the CSI report.

In a thirteenth aspect, alone or in combination with one or more of the first through twelfth aspects, process 400 includes selectively updating the CSI report based at least in part on the number of CPUs occupied for processing of the CSI report that is to include the L1-SINR.

In a fourteenth aspect, alone or in combination with one or more of the first through thirteenth aspects, the number of CPUs occupied for processing of the CSI report that is to include the L1-SINR is determined based at least in part on receiving a request for the CSI report.

In a fifteenth aspect, alone or in combination with one or more of the first through fourteenth aspects, the CSI reporting configuration indicates that the CSI report is to include the L1-SINR by including a report quantity parameter that is set to 'cri-SINR.'

In a sixteenth aspect, alone or in combination with one or more of the first through fifteenth aspects, the CSI reporting configuration indicates that the CSI report is to include the L1-SINR by including a report quantity parameter that is set to 'ssb-Index-SINR.'

In a seventeenth aspect, alone or in combination with one or more of the first through sixteenth aspects, the CSI reporting configuration indicates that the CSI report is to include the L1-SINR using a report quantity parameter in the CSI report.

In an eighteenth aspect, alone or in combination with one or more of the first through seventeenth aspects, the number of CPUs occupied for processing of the CSI report that is to include the L1-SINR is equal to a number of CPUs occupied for processing a reference signal received power parameter.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
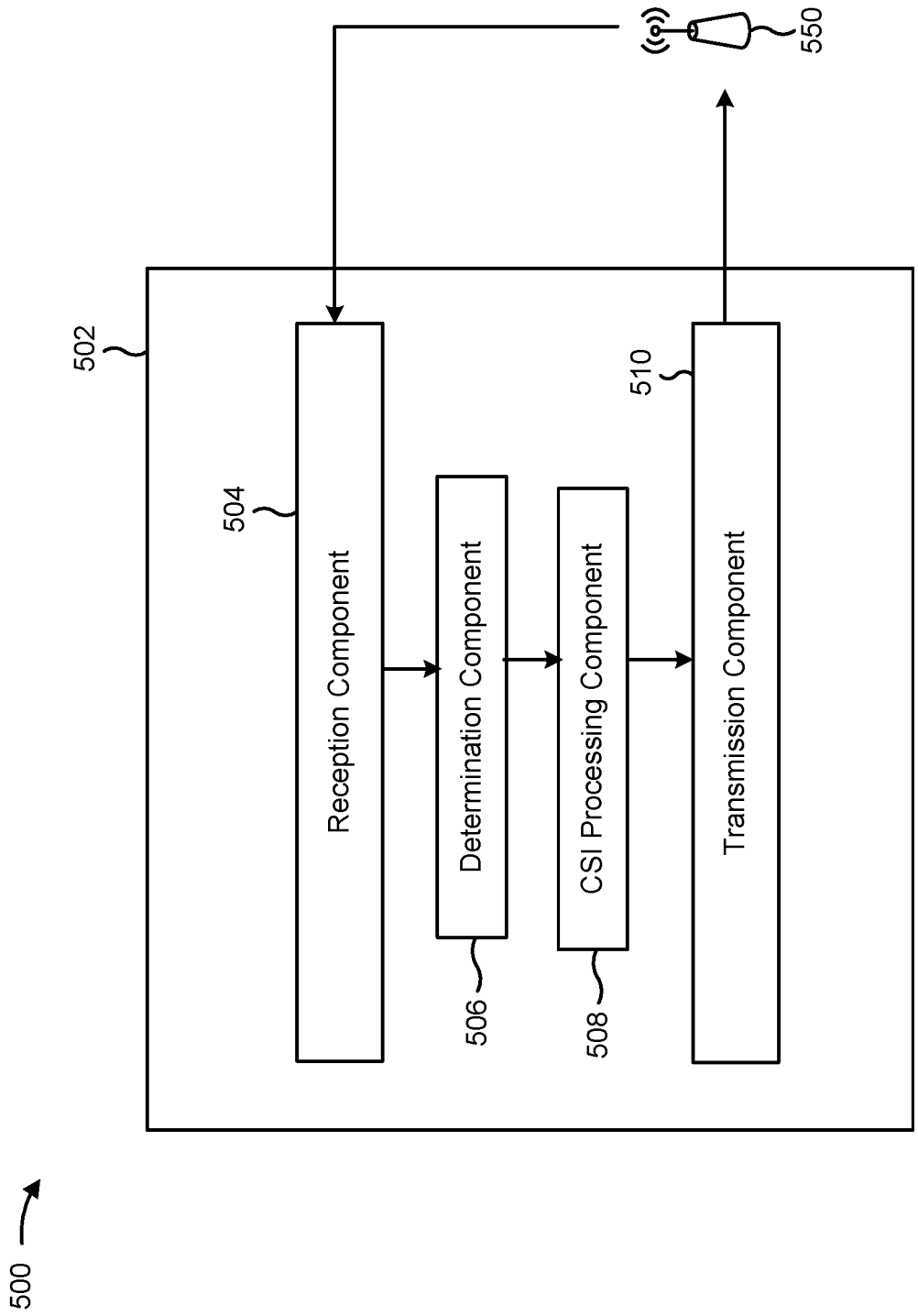
FIG. 5 is a conceptual data flow diagram illustrating the data flow between different modules/means/components in an example apparatus, in accordance with various aspects of the present disclosure.

FIG. 5 is a conceptual data flow diagram 500 illustrating the data flow between different modules/means/components in an example apparatus 502. The apparatus 502 may be a UE (e.g., UE 120). In some aspects, the apparatus 502 includes a reception component 504, a determination component 506, a CSI processing component 508, a transmission component 510, and/or the like.

The reception component 504 may receive (e.g., from an apparatus 550, such as a base station 110) a CSI reporting configuration for a CSI report. The CSI reporting configuration may indicate that the CSI report is to include L1-SINR (e.g., an L1-SINR parameter). The determination component 506 may determine a number of CPUs occupied for processing of the CSI report that is to include the L1-SINR, such as based at least in part on information regarding the CSI reporting configuration, which may be received from the reception component 504. The CSI processing component 508 may selectively update CSI based at least in part on an indication from the determination component 506. For example, the CSI processing component 508 may selectively update the CSI report based at least in part on the number of CPUs occupied for processing of the CSI report that is to include the L1-SINR. The transmission component 510 may transmit a CSI report (to the apparatus 550) that includes L1-SINR. In some aspects, the CSI report may include updated CSI or may include old (e.g., previously-determined CSI) based at least in part on information received from the CSI processing component 508 and/or the determination component 506.

The apparatus 502 may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a channel state information (CSI) reporting configuration for a first CSI report, wherein the CSI reporting configuration includes a report quantity parameter indicating that the first CSI report is to include a layer 1 signal to interference plus noise ratio (L1-SINR),
        wherein the CSI reporting configuration indicates that the first CSI report is to include the L1-SINR based on the report quantity parameter being set to 'cri-SINR' or 'ssb-Index-SINR';
    determining, based at least in part on the CSI reporting configuration including the report quantity parameter, that a quantity of CSI processing units (CPUs) occupied for processing of the first CSI report that is to include the L1-SINR is one; and
    dropping a second CSI report based at least in part on a quantity of available CPUs for processing the second CSI report being insufficient,
        wherein the quantity of available CPUs for processing the second CSI report is insufficient based at least in part on the quantity of CPUs occupied for the processing of the first CSI report that is to include the L1-SINR being one.

2. The method of claim 1, wherein the quantity of CPUs occupied for the processing of the first CSI report that is to include the L1-SINR is equal to a quantity of CPUs occupied for processing a reference signal received power parameter.

3. The method of claim 1, further comprising selectively updating the first CSI report based at least in part on the quantity of CPUs occupied for the processing of the first CSI report that is to include the L1-SINR.

4. The method of claim 1, wherein the quantity of CPUs occupied for the processing of the first CSI report that is to include the L1-SINR is determined based at least in part on receiving a request for the first CSI report.

5. The method of claim 1, wherein the CSI reporting configuration is included in a radio resource control (RRC) configuration message.

6. The method of claim 1, wherein the CSI reporting configuration is included in a radio resource control (RRC) reconfiguration message.

7. The method of claim 1, wherein the report quantity parameter indicates one or more other parameters that are to be reported in the first CSI report,
    wherein the one or more other parameters includes one or more of:
        a rank indication (RI) parameter,
        a channel quality indication (CQI) parameter,
        a precoding matrix indication (PMI) parameter,
        a reference signal received power (RSRP) parameter, or
        a layer indication (LI) parameter.

8. The method of claim 1, further comprising:
    transmitting information indicating a UE capability for a maximum quantity of CPUs for processing CSI reports.

9. A user equipment (UE) for wireless communication, comprising:
    a memory; and
    one or more processors coupled to the memory, the one or more processors configured to:
        receive a channel state information (CSI) reporting configuration for a first CSI report, wherein the CSI reporting configuration includes a report quantity parameter indicating that the first CSI report is to include a layer 1 signal to interference plus noise ratio (L1-SINR),
            wherein the CSI reporting configuration indicates that the first CSI report is to include the L1-SINR based on the report quantity parameter being set to 'cri-SINR' or 'ssb-Index-SINR';
        determine, based at least in part on the CSI reporting configuration including the report quantity parameter, that a quantity of CSI processing units (CPUs) occupied for processing of the first CSI report that is to include the L1-SINR is one; and
        drop a second CSI report based at least in part on a quantity of available CPUs for processing the second CSI report being insufficient,
            wherein the quantity of available CPUs for processing the second CSI report is insufficient based at least in part on the quantity of CPUs occupied for the processing of the first CSI report that is to include the L1-SINR being one.

10. The UE of claim 9, wherein the quantity of CPUs occupied for the processing of the first CSI report that is to include the L1-SINR is equal to a quantity of CPUs occupied for processing a reference signal received power parameter.

11. The UE of claim 9, wherein the one or more processors are further configured to selectively update the first CSI report based at least in part on the quantity of CPUs occupied for the processing of the first CSI report that is to include the L1-SINR.

12. The UE of claim 9, wherein the quantity of CPUs occupied for the processing of the first CSI report that is to include the L1-SINR is determined based at least in part on receiving a request for the first CSI report.

13. The UE of claim 9, wherein the CSI reporting configuration is included in a radio resource control (RRC) configuration message.

14. The UE of claim 9, wherein the CSI reporting configuration is included in a radio resource control (RRC) reconfiguration message.

15. The UE of claim 9, wherein the report quantity parameter indicates one or more other parameters that are to be reported in the first CSI report,
wherein the one or more other parameters includes one or more of:
a rank indication (RI) parameter,
a channel quality indication (CQI) parameter,
a precoding matrix indication (PMI) parameter,
a reference signal received power (RSRP) parameter, or
a layer indication (LI) parameter.

16. The UE of claim 9, further comprising:
transmitting information indicating a UE capability for a maximum quantity of CPUs for processing CSI reports.

17. A non-transitory computer-readable medium storing a set of instructions for wireless communication, the set of instructions comprising:
one or more instructions that, when executed by one or more processors of a user equipment (UE), cause the UE to:
receive a channel state information (CSI) reporting configuration for a first CSI report, wherein the CSI reporting configuration includes a report quantity parameter indicating that the first CSI report is to include a layer 1 signal to interference plus noise ratio (L1-SINR),
wherein the CSI reporting configuration indicates that the first CSI report is to include the L1-SINR based on the report quantity parameter being set to 'cri-SINR' or 'ssb-Index-SINR';
determine, based at least in part on the CSI reporting configuration including the report quantity parameter, that a quantity of CSI processing units (CPUs) occupied for processing of the first CSI report that is to include the L1-SINR is one; and
drop a second CSI report based at least in part on a quantity of available CPUs for processing the second CSI report being insufficient,
wherein the quantity of available CPUs for processing the second CSI report is insufficient based at least in part on the quantity of CPUs occupied for the processing of the first CSI report that is to include the L1-SINR being one.

18. The non-transitory computer-readable medium of claim 17, wherein the quantity of CPUs occupied for the processing of the first CSI report that is to include the L1-SINR is equal to a quantity of CPUs occupied for processing a reference signal received power parameter.

19. The non-transitory computer-readable medium of claim 17, wherein the one or more instructions further cause the UE to selectively update the first CSI report based at least in part on the quantity of CPUs occupied for the processing of the first CSI report that is to include the L1-SINR.

20. The non-transitory computer-readable medium of claim 17, wherein the quantity of CPUs occupied for the processing of the first CSI report that is to include the L1-SINR is determined based at least in part on receiving a request for the first CSI report.

21. The non-transitory computer-readable medium of claim 17, wherein the CSI reporting configuration is included in a radio resource control (RRC) configuration message.

22. The non-transitory computer-readable medium of claim 17, wherein the CSI reporting configuration is included in a radio resource control (RRC) reconfiguration message.

23. The non-transitory computer-readable medium of claim 17, wherein the report quantity parameter indicates one or more other parameters that are to be reported in the first CSI report,
wherein the one or more other parameters includes one or more of:
a rank indication (RI) parameter,
a channel quality indication (CQI) parameter,
a precoding matrix indication (PMI) parameter,
a reference signal received power (RSRP) parameter, or
a layer indication (LI) parameter.

24. An apparatus for wireless communication, comprising:
means for receiving a channel state information (CSI) reporting configuration for a first CSI report, wherein the CSI reporting configuration includes a report quantity parameter indicating that the first CSI report is to include a layer 1 signal to interference plus noise ratio (L1-SINR),
wherein the CSI reporting configuration indicates that the first CSI report is to include the L1-SINR based on the report quantity parameter being set to 'cri-SINR' or 'ssb-Index-SINR';
means for determining, based at least in part on the CSI reporting configuration including the report quantity parameter, that a quantity of CSI processing units (CPUs) occupied for processing of the first CSI report that is to include the L1-SINR is one; and
means for dropping another a second CSI report based at least in part on the quantity of CPUs occupied for the processing of the CSI report that is to include the L1 SINR and based at least in part on a quantity of available CPUs for processing the other second CSI report being insufficient,
wherein the quantity of available CPUs for processing the second CSI report is insufficient based at least in part on the quantity of CPUs occupied for the processing of the first CSI report that is to include the L1-SINR being one.

25. The apparatus of claim 24, wherein the quantity of CPUs occupied for the processing of the first CSI report that is to include the L1-SINR is equal to a quantity of CPUs occupied for processing a reference signal received power parameter.

26. The apparatus of claim 24, further comprising means for selectively updating the first CSI report based at least in part on the quantity of CPUs occupied for the processing of the first CSI report that is to include the L1-SINR.

27. The apparatus of claim 24, wherein the quantity of CPUs occupied for the processing of the first CSI report that is to include the L1-SINR is determined based at least in part on receiving a request for the first CSI report.

28. The apparatus of claim 24, wherein the CSI reporting configuration is included in a radio resource control (RRC) configuration message.

29. The apparatus of claim 24, wherein the CSI reporting configuration is included in a radio resource control (RRC) reconfiguration message.

30. The apparatus of claim 24, wherein the report quantity parameter indicates one or more other parameters that are to be reported in the first CSI report,
   wherein the one or more other parameters includes one or more of:
      a rank indication (RI) parameter,
      a channel quality indication (CQI) parameter,
      a precoding matrix indication (PMI) parameter,
      a reference signal received power (RSRP) parameter, or
      a layer indication (LI) parameter.

\* \* \* \* \*